W. H. VON TISH.
MAGNETIC MOTOR.
APPLICATION FILED SEPT. 16, 1907.
926,369.
Patented June 29, 1909.
2 SHEETS—SHEET 1.
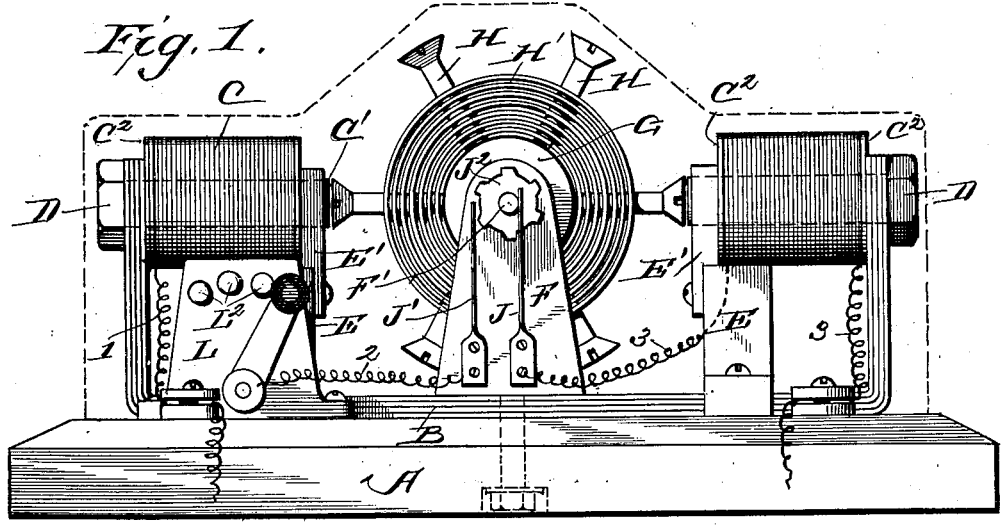
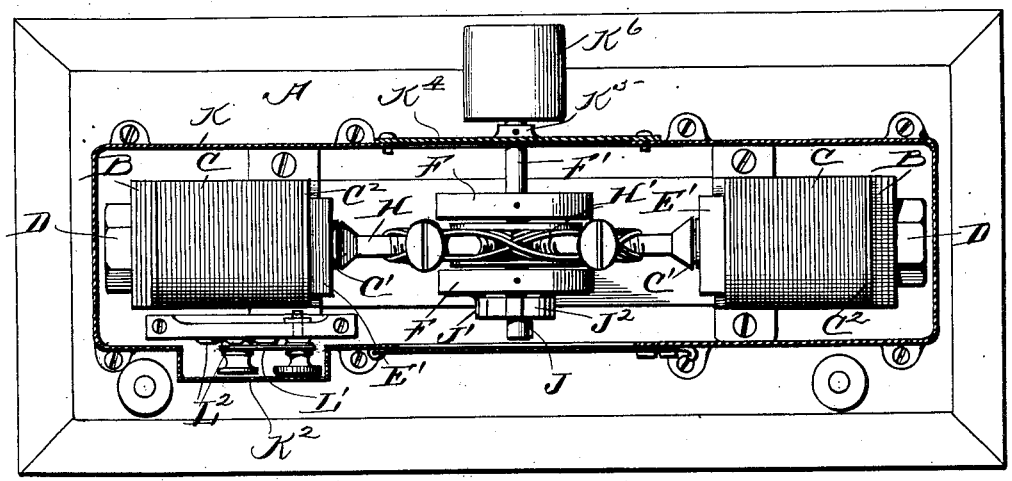
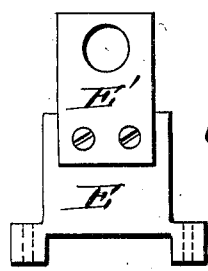
Witnesses,
William H. Von Tish,
Inventor,
Attorneys.

W. H. VON TISH.
MAGNETIC MOTOR.
APPLICATION FILED SEPT. 16, 1907.
926,369.
Patented June 29, 1909.
2 SHEETS—SHEET 2.
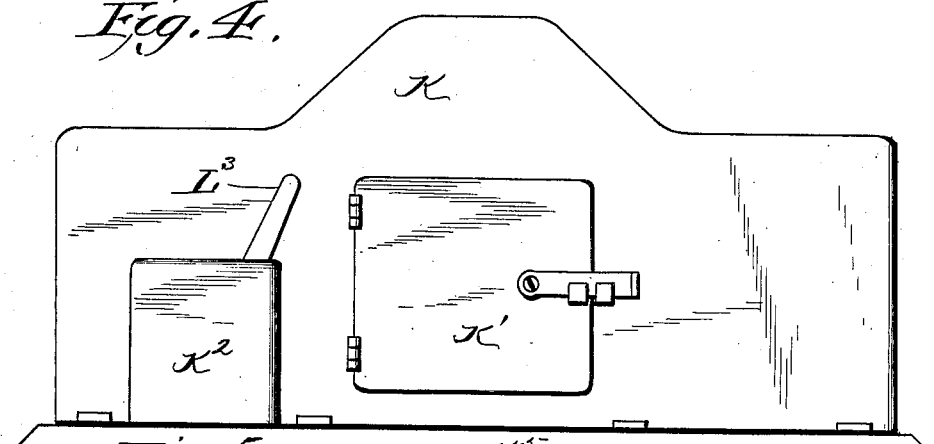
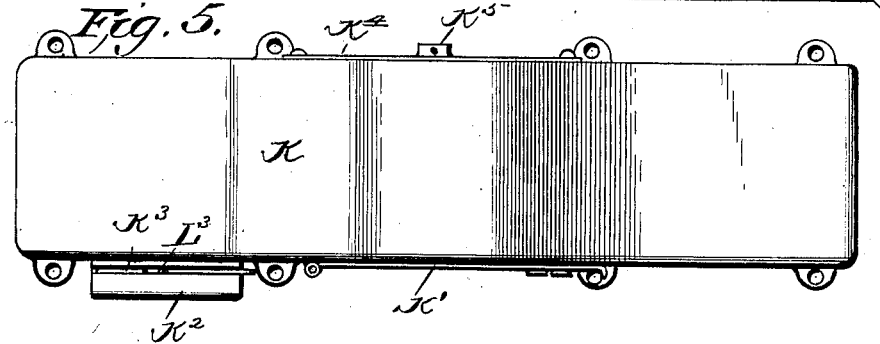
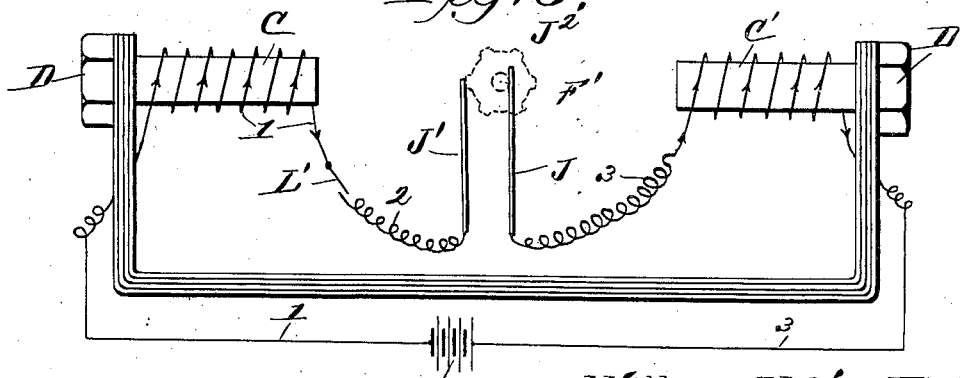
Witnesses,
William H. Von Tish,
Inventor,
Attorneys,

UNITED STATES PATENT OFFICE.

WILLIAM H. VON TISH, OF MONTCLAIR, NEW JERSEY.

MAGNETIC MOTOR.

No. 926,369.  Specification of Letters Patent.  Patented June 29, 1909.

Application filed September 16, 1907. Serial No. 393,194.

*To all whom it may concern:*

Be it known that I, WILLIAM H. VON TISH, a citizen of the United States, residing at Montclair, in the county of Essex, in the State of New Jersey, have invented a new and useful Improvement in Magnetic Motors, of which the following is a specification.

This invention relates to a magnetic motor and the object of the invention is a motor in which the armature is rotated by attraction of the armature poles to the magnet poles, the magnets being excited by an electrical current which is automatically broken and the magnets deënergized as the poles of the armature place themselves in horizontal alinement with the poles of the magnets.

A further object of the invention is a motor which can be easily and cheaply constructed and is therefore adapted especially for use as a toy motor or when constructed upon a larger scale is adapted for use in schools for illustrating lessons in magnetism, and also for use in industrial schools in which case the motor can be readily built by the students.

The invention consists of a laminated yoke carrying two magnets having their unlike poles in opposition to each other, an armature mounted between the said poles, projecting pole pieces carried by the armature, means for passing an electric current around the magnets in one direction and means for automatically breaking the current in the magnet coils when armature poles lie in horizontal alinement with magnet poles.

In the drawings forming a part of this specification:—Figure 1 is a side elevation of the motor, the casing being shown in dotted lines. Fig. 2 is a plan view of the motor, the casing being shown in section and connecting wires being removed to more clearly show the mechanical construction of the motor. Fig. 3 is a face view of a bearing for the magnet poles. Fig. 4 is a side elevation showing the motor with casing in position. Fig. 5 is a top plan view of Fig. 4. Fig. 6 is a side elevation of the magnet yoke showing the cores and illustrating partly in elevation and partly in diagram the electric circuit through the field coils, of a circuit breaker being shown in dotted lines.

In these drawings A represents a suitable base upon which is mounted a laminated yoke B, which yoke carries electro-magnets C, formed of the usual wire coils and provided with cores C'. The cores are locked in the yoke by means of nuts D and are supported at their inner ends by means of uprights E upon which the magnet coils rest and which carry bearing blocks E' provided with openings through which the cores C' slightly project. Parallel standards F are provided with suitable bearings for a rotatable shaft F' upon which is mounted an armature drum G, provided with a plurality of outwardly projecting metallic poles H, between which are wound metal strips H' to provide a passage for the magnetic flux between the magnet poles.

Upon one of the standards F are secured copper strips J and J' and the upper free end of the strip J bears upon the shaft F' upon which is also fixed a circuit breaker $J^2$ consisting of a disk having a plurality of blunt projecting teeth equal in number to the number of armature poles H. The copper strip J' engages these teeth and is so arranged that while it will engage the teeth it will not drop sufficiently into the space between them to contact with the disk portions of the circuit breaker $J^2$ and the parts are so positioned that the free end of the strip J' will break contact with a tooth of the disk $J^2$ at the same moment that two of the poles H place themselves in horizontal alinement with the pole C'.

In Fig. 1 of the drawing, I have shown the strip J' out of engagement with the teeth of the disk, the contact having just been broken. In Fig. 6 I have shown the strip in contact with one of said teeth. These parts are preferably inclosed in the casing K, provided upon one side with a hinged door K', said bore being upon the side of the circuit breaking device and upon the same side I arrange an extension $K^2$ to receive a suitable switch to be hereafter described, said extension $K^2$ having a slot $K^3$ extending across this top. Upon the opposite side of the casing is fitted a plate $K^4$ which carries a bearing $K^5$ for the shaft F' and a suitable pulley $K^6$ is arranged upon the projecting end of the said shaft.

In order to throw the motor into and out of operation, I mount upon a suitable block L a pivoted switch L' which works over a row of projecting pins $L^2$ arranged in the form of a segment, and preferably four in number, one of said pins being of metal and the other three being of wood or other insulating material. In the drawings I have shown the switch resting upon the metal pin and it will be readily understood by moving it over upon the wooden pins circuit will be broken and the magnetic fields deënergized.

In order to operate the switch when the casing is used, the ordinary form of handle L' shown in Figs. 1 and 2 are replaced by a straight lever L³ which projects upwardly through the slot K³ of the extension K². The electrical circuit consists of a wire 1, leading from a battery M, or other suitable source of electric power, said wire being coiled about the core C' of one of the magnets C and thence leading to the metal pin L², the current passing through the switch lever L' or L³ as the case may be, thence by a wire 2, to the contact strip J', through the disk J² of the circuit breaker, shaft F', strip J, and wire 3, which passes around the pole C' of the other magnet and back to the battery.

It will be understood that the shaft F' is of metal and the drum G of the armature of wood and that the shaft F' is mounted in wooden bearings which in turn are mounted upon a wooden base. The plate K⁴ may be of any suitable material and if of metal the bearings K⁵ can be supplied with mica bushings or any other suitable form of insulating bearings.

The above is a brief general description of the construction of the motor in which form it could be used for light power purposes when constructed upon a sufficiently large scale. It can also be employed for demonstrating the principles underlying magnetic induction and the laws of magnetic attraction.

A more detailed description of motor either as a toy to be constructed by boys interested in constructing electrical toys or by students in elementary magnetism will make clear some features of construction shown in the drawings.

The base A of the motor shown in the drawings is substantially about ten inches in length by three and one-half inches in width and I have shown the same as being beveled along the edges. The motor fi''' or yoke B, is made up of strips ten inches in length of hoop iron or they may be cut from stove pipe iron. The upturned end portions are drilled to receive the magnet cores which are made of short three-eighths inches carriage bolts with the heads removed. These bolts are inserted through the openings formed in the yoke with the threaded ends projecting and are held in place by the nuts D which are threaded upon the ends of the bolts. Cardboard washers C² are placed upon the bolts and between said washers the bolts are wound with one and one-fourth ounces of number 18 single covered magnetic wire. When each magnet has been wrapped the coils are given several coats of shellac which bind the outer layers together and serve to hold the coils in place. The uprights E which support the inner ends of the magnets bridge over the horizontal portion of the yoke B and serve as clamps to secure said yoke upon the base. Each of the uprights E is provided with a bearing block E' in which the inner end portion of the bolt forming the core C' rests, and they serve to hold the cores in a true horizontal plane. The pieces E' may be made of kornit, hard wood, hard rubber or any other suitable material which it may be convenient to use for this purpose.

The armature drum G of the motor shown in the drawings is of wood about one inch in diameter such as may be cut from an ordinary broom-stick. This drum is provided with a plurality of small holes drilled into its periphery and spaced equally apart and preferably six in number. Into these holes are inserted metal screws or iron pegs of any suitable size may be employed, and these form the armature poles H. To provide a larger metal mass for passage of the magnetic flux from one pole to the other I take strips of number 18 iron wire such as are used for stove pipe hangings and these are woven in and out between the poles H and around the drum G, as shown at H'.

The disk J is cut from copper and may be filed to provide the teeth which are of the same number as the poles and spaced equidistant apart. In constructing a machine of larger size the disk J² may be made heavier in order to provide a firm bearing and also to furnish means by which it may be keyed or otherwise secured upon the shaft. In the smaller form being described, the shaft F' is formed of a piece of iron wire. The construction of the other parts will be easily understood from the description already given.

The operation of the device is as follows:— The switch L' being set upon the metal pin or knob a current flows from the battery M through the circuit above described and should the motor ever stop with the circuit broken at the circuit breaker the armature can be rotated by the hand to bring the tooth of the disk J² into contact with the strip J¹ thus completing the electrical circuit through the field coils of the magnets. The magnets being energized the poles C' will attract the poles H nearest to them and as the magnet poles are unlike it will be obvious that this attraction will tend to rotate the drum G in one direction. As soon however as the poles H have moved into alinement with the magnet poles, the rotation of the disk J² will cause a tooth to break contact with the strip J' and the magnets being deënergized rotation of the drum G will continue through momentum thus carrying the poles through a distance exceeding thirty degrees when the next tooth will come into engagement with the strip J' and the magnets will again be deënergized and will again attract the following poles H which are at a less distance, that is within about twenty-five degrees of being in alinement with the poles. This operation will be repeated indefinitely as long as the switch is closed, thus causing a practically continuous rotation on one direction of the armature, and it will be understood that no electrical current is passed through the armature and no coils are carried by the armature in such a manner that they cut at right angles the magnetic field and consequently no counter-electromotive force is developed.

What I claim is:—

A device of the kind described comprising a base, a laminated yoke arranged on said base, electro magnets carried by said yoke and having unlike poles in opposition to each other, an armature drum arranged between said magnets a plurality of outwardly projecting metallic poles, carried by said drum, metallic strips interwound around said drum and between said poles the said strips passing circumferentially around the drum, means for energizing said magnets, and means for deënergizing the magnets as the poles of the armature aline with the poles of the magnets.

WILLIAM H. VON TISH.

Witnesses:
Mrs. M. VON TISH,
SIEG. CRONHEIM.